United States Patent Office.

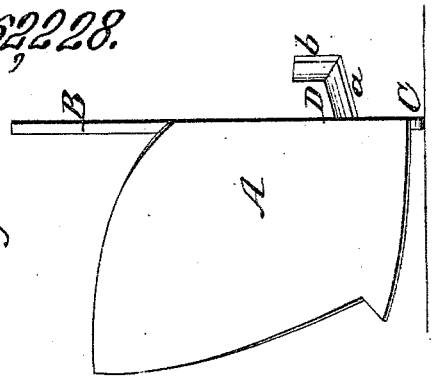
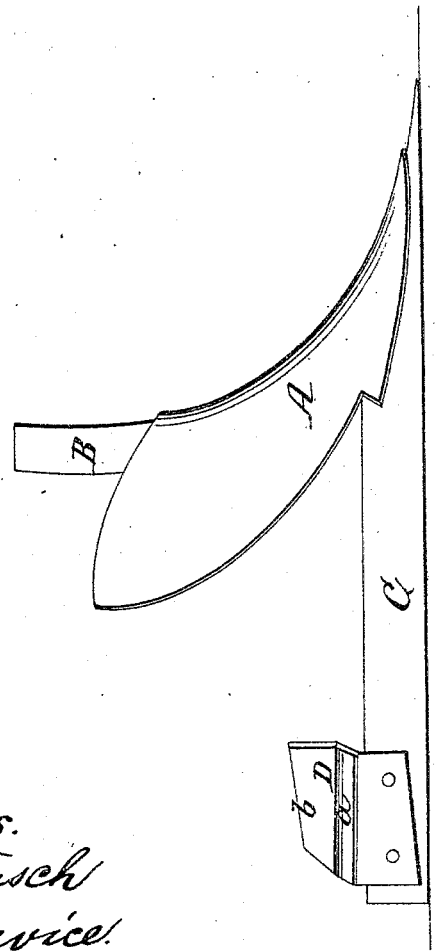

TURNER SAUNDERS, OF MEMPHIS, TENNESSEE.

Letters Patent No. 62,228, dated February 19, 1867.

IMPROVEMENT IN COTTON-SCRAPER.

*The Schedule referred to in these Letters Patent and making part of the same.*

TO ALL WHOM IT MAY CONCERN:

Be it known that I, TURNER SAUNDERS, of the city of Memphis, in the county of Shelby, and State of Tennessee, have invented a new Improvement in Cotton-Scrapers; and I do hereby declare that the following is a full, clear, and exact description thereof, which will enable others skilled in the art to make and use the same, reference being had to the accompanying drawings, forming a part of this specification.

This invention consists in attaching a scraper to a plough in such a manner that the cotton plants may be ploughed or barred off and scraped at one operation. Hitherto the cotton has been ploughed or barred off with an ordinary turning plough and a scraper afterward used, the latter implement being rather difficult to manage, and not permitting the earth to be scraped evenly from the plants. My improvement admits of the two operations specified being performed simultaneously and with the greatest facility, thereby effecting a great saving in labor and performing the work in a more perfect manner than usual. In the accompanying sheet of drawings—

Figure 1 is a side view of my invention.
Figure 2 a front view of the same.
Similar letters of reference indicate like parts.

A represents the mould-board of an ordinary turning plough, B the standard thereof, and C the land-side bar, the latter being considerably longer than usual, as shown in fig. 1. D is a scraper, attached to the land-side bar near its rear end, and extending outward therefrom, said scraper having a portion, $a$, which is slightly inclined from a horizontal plane, and a vertical portion, $b$, at the outer end of the portion $a$, as shown clearly in fig. 2. This scraper may be constructed of steel or other suitable metal. The scraper, it will be seen by referring to fig. 2, extends considerably outward from the right-hand side of the land-side bar, and in using the implement the plough bars off or casts the earth from the row of plants, while the scraper D will scrape off the earth quite close to the row, and without danger of injuring the plants. The scraper, in consequence of being attached to the land-side of the plough, runs steady, and, consequently, it may be guided with precision close to the plants. The scraper, when used alone, is rather difficult to manage; being light, it is liable to be deflected from its course either to the right or left, sometimes working close to the plants and injuring the same, and then moving off from them and leaving a wide strip of earth unscraped, which greatly augments the labor of the after hoeing operation if the weeds are taken fully out.

My invention fully obviates this difficulty, besides reducing greatly the expense of cultivating cotton and insuring the work being done in a thorough and perfect manner.

Having thus described my invention, what I claim as new, and desire to secure by Letters Patent, is—

The combination of the scraper and plough, the parts being constructed and arranged to operate in the manner substantially as and for the purpose herein set forth.

The above specification of my invention signed by me this 24th day of November, 1866.

TURNER SAUNDERS.

Witnesses:
T. M. MANNING,
J. K. MARTIN.